(12) United States Patent
Jin et al.

(10) Patent No.: US 12,372,438 B2
(45) Date of Patent: Jul. 29, 2025

(54) FULL-SEA DEPTH MULTI-POINT IN-SITU SAMPLER, AND SAMPLING AND TRANSFER METHOD USING THE SAME

(71) Applicant: HUNAN UNIVERSITY OF SCIENCE AND TECHNOLOGY, Xiangtan (CN)

(72) Inventors: Yongping Jin, Xiangtan (CN); Guangping Liu, Xiangtan (CN); Youduo Peng, Xiangtan (CN); Wenbo Tang, Xiangtan (CN); Ping Liu, Xiangtan (CN)

(73) Assignee: HUNAN UNIVERSITY OF SCIENCE AND TECHNOLOGY, Xiangtan (CN)

( * ) Notice: Subject to any disclaimer, the term of this patent is extended or adjusted under 35 U.S.C. 154(b) by 329 days.

(21) Appl. No.: 18/314,730

(22) Filed: May 9, 2023

(65) Prior Publication Data
US 2023/0273097 A1   Aug. 31, 2023

(51) Int. Cl.
*G01N 1/04*   (2006.01)
*G01N 1/14*   (2006.01)

(52) U.S. Cl.
CPC ............ *G01N 1/04* (2013.01); *G01N 1/14* (2013.01)

(58) Field of Classification Search
CPC .... G01N 1/04; G01N 2001/1031; G01N 1/14; G01N 1/12
See application file for complete search history.

(56) References Cited

U.S. PATENT DOCUMENTS 3,392,794 A * 7/1968 Kurillo, Jr. ............. E21B 25/18
175/6
7,681,662 B2 * 3/2010 Asakawa ................ E21B 43/35
73/864.45

FOREIGN PATENT DOCUMENTS

| CN | 101639415 A | 2/2010 |
| CN | 105445053 A | 3/2016 |

* cited by examiner

*Primary Examiner* — Kristina M Deherrera
*Assistant Examiner* — Gedeon M Kidanu

(57) ABSTRACT

A full-sea depth multi-point in-situ sampler includes a sampling assembly, a pressure-retaining assembly, a pressure-compensating assembly, and a cleaning assembly. The sampling assembly includes a handle, an extrusion valve, a needle valve core, a two-stage piston, a sampling tube, and a capturing device. The pressure-retaining assembly includes a pressure-retaining cylinder, a locking mechanism, a floating valve core, a support spring, and a drainage device. The pressure-compensating assembly includes a pressure-compensating cylinder, a piston, and an end cap. The cleaning assembly includes a cleaning sleeve, a cleaning cylinder, and multiple trigger mechanisms. A sampling and transfer method based on the sampler is also provided.

13 Claims, 7 Drawing Sheets

FULL-SEA DEPTH MULTI-POINT IN-SITU SAMPLER, AND SAMPLING AND TRANSFER METHOD USING THE SAME

TECHNICAL FIELD

This application relates to seabed sampling, and more particularly to a full-sea depth multi-point in-situ sampler, and a sampling and transfer method using the same.

BACKGROUND

There are abundant microbial communities and sediments on the deep-sea bed which reflect the evolution of the deep-sea environment, are of great significance in researches of marine sedimentation and tectonic evolution, paleo-oceanographic and paleomagnetic studies, exploration of seabed mineral resources, and deep-sea engineering. The surface sediments contain a large number of barophilic microorganisms and gases (e.g., $CH_4$, $H_2S$ and $H_2$). Moreover, there are still a wide variety of living organisms at the ocean floor, especially those existing under extreme conditions below 6000 m, which have attracted considerable attention from the biologists. The collection of original samples of these sediments and barophilic microorganisms is extremely important for the marine scientific research. The existing sediment samplers cannot be applied to a depth exceeding 7000 m, and for a single sampler, the sampling can only be performed once in one voyage of the manned submersible. Moreover, the related sampling and transferring techniques are unsatisfactory. Therefore, there is an urgent need for those skilled in the art to design and develop a full-sea depth multi-point in-situ sampler with simple structure, convenient operation and high reliability, and a sampling and transfer method using the same.

SUMMARY

In view of the deficiencies in the prior art, this application provides a full-sea depth multi-point in-situ sampler with simple and compact structure, convenient operation and high reliability, and a sampling and transfer method using the same.

Technical solutions of this application are described as follows.

In a first aspect, this application provides a full-sea depth multi-point in-situ sampler, including:
  a sampling assembly;
  a pressure-retaining assembly;
  a pressure-compensating assembly; and
  a cleaning assembly;
  wherein the sampling assembly includes a handle, an extrusion valve, a needle valve core, a first piston, a sampling tube, and a capturing member;
  an upper part of the sampling tube is threadedly connected to a lower part of the needle valve core; a lower end of the handle is boltedly connected to a top of the needle valve core; the first piston is provided on an inner wall of the sampling tube, and the first piston is a two-stage piston; an upper side wall of the sampling tube is provided with a plurality of drainage holes; a bottom of the sampling pipe is provided with the capturing member; the extrusion valve is fixedly connected to the handle through a first fixing plate; the extrusion valve includes a first pressure pipe, and is connected to the needle valve core through the first pressure pipe; and the first pressure pipe is configured to pass through the needle valve core to communicate with a cavity above the first piston;
  the pressure-retaining assembly includes a pressure-retaining cylinder, a locking mechanism, a floating valve core, a support spring, and a drainage device;
  the pressure-compensating assembly includes a pressure-compensating cylinder, a second piston, and an end cap; and
  the cleaning assembly includes a cleaning sleeve, a cleaning cylinder, and a plurality of trigger mechanisms.

In an embodiment, an upper part of the needle valve core is cylindrical, and the lower part of the needle valve core is inverted frustum-shaped; and
  the first piston includes a sealing piston unit and an extrusion piston unit from top to bottom; a first through hole is provided at a center of the sealing piston unit; an upper end of the extrusion piston unit is connected with a lower end of the first through hole of the sealing piston unit, and a connection between the upper end of the extrusion piston unit and the lower end of the first through hole is sealed by a first sealing ring; a first blind hole is provided at a center of the extrusion piston unit; an air-change rod is fixed at a lower end of the needle valve core through a port; the air-change rod is coaxial with the first through hole and the first blind hole, and is configured to be inserted into the first through hole and the first blind hole; a lower end of the air-change rod is provided with a second blind hole; an outer wall of the second blind hole is symmetrically provided with two second through holes; and the sealing piston unit and the extrusion piston unit are sealed with the inner wall of the sampling tube through a second sealing ring.

In an embodiment, the locking mechanism includes a pull rod, an outer cover, a locking spring, and a thrust part; and
  an upper part of the pressure-retaining cylinder is provided with a plurality of first holes in the same level; the plurality of first holes are arranged along a radial direction of the pressure-retaining cylinder; the thrust part is installed in the plurality of first holes; the outer cover is boltedly fixed on an outer side wall of the upper part of the pressure-retaining cylinder; the outer cover is provided with a second hole; the pull rod is configured to pass through the second hole to be connected with the thrust part; the locking spring is sleevedly provided on the pull rod; one end of the locking spring is fixedly connected with the outer cover, and the other end of the locking spring is fixedly connected with the thrust part; the thrust part is radially provided with a first key slot; a key is fixedly provided in the first key slot; the thrust part is movable in the plurality of first holes; a side wall of each of the plurality of first holes is provided with a second key slot for guiding movement of the thrust part in the plurality of first holes; the key is disposed in the second key slot; and an upper part of an inner side of the thrust part is an inverted cone surface, and the lower part of the inner side of the thrust part is a cylindrical surface matching with an upper part of the needle valve core.

In an embodiment, the number of the locking mechanism is three, and three locking mechanisms are evenly distributed on an outer wall of the pressure-retaining cylinder in a circumferential direction.

In an embodiment, an inner hole of the pressure-retaining cylinder below the locking mechanism is a stepped hole; a step surface of the inner hole is provided with a plurality of blind holes parallel to an axis of the pressure-retaining cylinder; each of the plurality of blind holes is provided with the support spring; an upper end of the support spring is provided with the floating valve core; an upper surface of the floating valve core is an inverted conical surface matching with the lower part of the needle valve core; and a ring washer and a sealing ring are provided to realize a radial sealing between the floating valve core and the pressure-retaining cylinder.

In an embodiment, the drainage device includes a top cover, a pull rod, an ejector pin, a spring, a valve body, and a valve seat;

the top cover is boltedly connected to the valve seat; a side wall of the top cover is provided with a first through hole; the pull rod is provided in the first through hole, and a gap is provided between the pull rod and the first through hole; a side of the pull rod is provided with a U-shaped groove; a lower part of the ejector pin is cylindrical, a middle part of the ejector pin is frustum-shaped, and an upper part of the ejector pin is a cylinder with a spherical top surface; an internal center of the valve body is provided with a second through hole matching with the ejector pin; the ejector pin is provided in the second through hole; a gap is provided between the second through hole and the ejector pin; a first sealing ring is provided on the middle part of the ejector pin to realize an axial sealing between the second through hole and the ejector pin while the ejector pin is moved up; the valve body is boltedly connected to the valve seat; the valve seat is provided with a second sealing ring to realize a radial sealing between the valve body and the valve seat; a center on an upper end surface of the valve seat is provided with a blind hole; a lower end of the spring is installed in the blind hole; an upper end of the spring is connected with a lower end of the ejector pin; a bottom of the valve body is provided with a pressure port; a top of the pressure port is communicated with a bottom of the blind hole, and a bottom of the pressure port is connected to a pressure port of the pressure-retaining assembly; when the pull rod is pulled along a first direction, an upper end of the ejector pin is in contact with the U-shaped groove, and the spring pushes the ejector pin to move upward, thereby closing the drainage device; and when the pull rod is pushed along a second direction opposite to the first direction, the ejector pin is in contact with a lower end surface of the pull rod, and the spring is compressed by the ejector pin, thereby opening the drainage device.

In an embodiment, the pressure-compensating assembly is integrated with the pressure-retaining assembly; the pressure-compensating cylinder is located below a partition between the pressure-compensating cylinder and the pressure-retaining cylinder; the end cap is sealedly provided at a bottom opening of the pressure-compensating cylinder; the end cap is provided with a through hole; a second pressure pipe is provided in the through hole for connection with a charging valve; the second piston is arranged in the pressure-compensating cylinder to divide the pressure-compensating cylinder into an upper cavity and a lower cavity; and the upper cavity of the pressure-compensating cylinder is communicated with the pressure-retaining cylinder through a third pressure pipe.

In an embodiment, a top of the cleaning assembly is provided with a second fixing plate; the cleaning assembly is connected to an upper end surface of the pressure-retaining assembly through the second fixing plate; the cleaning cylinder is boltedly connected to a lower part of the second fixing plate; the plurality of trigger mechanisms are evenly distributed on a side wall of a top of the cleaning cylinder; and the cleaning sleeve is installed on an outer side of the needle valve core.

In an embodiment, the number of the plurality of trigger mechanisms is four, and four trigger mechanisms are evenly distributed on an outer wall of the cleaning cylinder in a circumferential direction; each of the four trigger mechanisms includes a trigger rod, a compression spring, and a trigger cylinder; the outer wall of the cleaning cylinder is provided with a trigger cylinder hole, and the trigger cylinder is installed in the trigger cylinder hole; the trigger cylinder is provided with a guide hole; the trigger rod is insertedly provided in the guide hole; one end of the compression spring is connected to the trigger cylinder hole, and the other end of the compression spring is connected to one end of the trigger rod; and the other end of the trigger rod faces toward an axis of the cleaning cylinder.

In an embodiment, the pressure-retaining cylinder is made of a titanium alloy material.

In an embodiment, an outer diameter of the sampling tube is less than an inner diameter of the pressure-retaining cylinder; and a length of the sampling tube is less than a height of the pressure-retaining cylinder.

In an embodiment, the number of the sampling assembly and the number of the pressure-retaining assembly are both two or more.

This application further provides a sampling and transfer method based on the full-sea depth multi-point in-situ sampler, including:
  (a) before deploying the full-sea depth multi-point in-situ sampler, filling a lower cavity of the pressure-compensating cylinder with inert gas through a charging valve, wherein the second piston is located at a top of a cavity of the pressure-compensating cylinder; fixing the full-sea depth multi-point in-situ sampler to a submersible; fixing the cleaning sleeve to the needle valve core; and pushing a pull rod of the drainage device to connect the drainage device with the pressure-retaining assembly;
  (b) during a launching process of the submersible, under the action of seawater pressure, moving the second piston downward until a pressure balance is reached between the lower cavity and an upper cavity of the pressure-compensating cylinder;
  (c) when the submersible reaches a preset seabed depth, pressing the sampling assembly into seabed sediment through a manipulator until the sampling tube is completely inserted into the seabed sediment, wherein while the sampling tube is inserted into the seabed sediment, seawater in the sampling tube is discharged through the plurality of drainage holes distributed radially at a top of the sampling tube;
  (d) After completing sampling, inserting the sampling assembly into the cleaning cylinder through the manipulator; clamping the cleaning sleeve at the needle valve core by the plurality of trigger mechanisms at an upper end of the cleaning cylinder, wherein a center of the cleaning sleeve is provided with a third through hole having a cone surface matching with an outer wall of the needle valve core, and the cleaning sleeve is installed on the outer wall of the needle valve core; pulling the sampling assembly out by the manipulator, wherein since an axial movement of the cleaning sleeve is restricted by the plurality of trigger mechanisms, a relative displacement occurs between the cleaning sleeve and the sampling assembly, such that sediments adhering to an outer surface of the sampling assembly are scraped off, thereby completing cleaning of the outer surface of the sampling assembly;
  (e) pulling the sampling tube from the cleaning assembly, and inserting the sampling tube into the pressure-retaining assembly, wherein guided by an oblique cone surface of the floating valve core, an outer wall of the sampling tube is in contact with a thrust part; allowing the thrust part to compress a locking spring to drive a pull rod of the locking mechanism to move outward; moving the sampling tube downward; resetting the thrust part under the action of the locking spring, and locking the sampling tube in the pressure-retaining assembly to constrain an upward axial displacement of the needle valve core; and pulling the pull rod of the drainage device to close the drainage device;

(f) while recovering the full-sea depth multi-point in-situ sampler, due to decrease of the seawater pressure, driving, by the inert gas in the pressure-compensating assembly, the second piston to move towards the upper cavity of the pressure-compensating cylinder such that seawater in the upper cavity of the pressure-compensating cylinder is forced to flow into the pressure-retaining cylinder through a pressure pipe, thereby compensating for a pressure loss caused by expansion and deformation of the pressure-retaining cylinder;

(g) coupling the full-sea depth multi-point in-situ sampler with a transfer device: connecting a pressurized pump with the extrusion valve; pressurizing the upper part of the sampling tube to make a pressure in the upper part of the sampling tube greater than that in a lower part of the sampling tube; allowing the sealing piston unit and the extrusion piston unit to slide down under the action of pressure, wherein when the plurality of drainage holes on the sampling tube are sealed by the sealing piston unit, water in the sampling tube is allowed to reach a middle cavity of the sampling tube through the two holes at the lower end of the air-change rod, and the sealing piston unit stops moving; and (h) forming a pressure difference between the middle cavity and a lower cavity of the sampling tube as pressure of the middle cavity of the sampling tube continues to increase; and under the action of the pressure difference between the middle cavity and the lower cavity of the sampling tube, pushing, by the extrusion piston unit, sediments in the lower cavity of the sampling tube to the transfer device.

Compared to the prior art, this application has the following beneficial effects.

(1) The full-sea depth multi-point in-situ sampler provided herein can effectively realize the pressure-retaining and in-situ sampling of sediment samples in the whole sea area.

(2) The full-sea depth multi-point in-situ sampler adopts an integrated structure of pressure retaining and pressure compensating, which avoids the blockage caused by the floating of sediment particles between the pressure-retaining assembly and the pressure-compensating assembly, thereby avoiding affecting the pressure-retaining effect. At the same time, the volume and weight of the sampler is reduced, facilitating the spatial layout of the sampler.

(3) The full-sea depth multi-point in-situ sampler adopts an automatic centering structure and a floating valve core to ensure that the valve core only carries axial load and automatically fits the sealing cone of the pressure-retaining assembly, and the sealing effect is better with the increase of the pressure difference between the inside and outside the pressure-retaining assembly.

(4) The full-sea depth multi-point in-situ sampler provided herein adopts a release type cleaning assembly, which can effectively remove sediments on the outer surface of the sampling assembly, thereby avoiding the pressure-retaining and sealing function failure.

DETAILED DESCRIPTION OF EMBODIMENTS

The disclosure will be further described in detail below in conjunction with the accompanying drawings and embodiments.

Referring to FIGS. 1-7, a full-sea depth multi-point in-situ sampler includes a sampling assembly 1, a pressure-retaining assembly 4, a pressure-compensating assembly 3, and a cleaning assembly 5.

Figure 3:
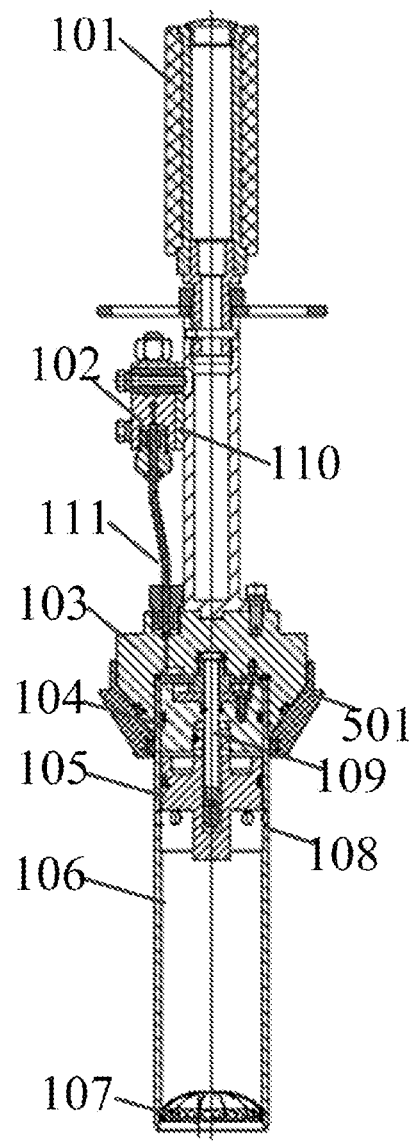
FIG. 3 is a sectional view of a sampling assembly according to one embodiment of the present disclosure.
Figure 4:
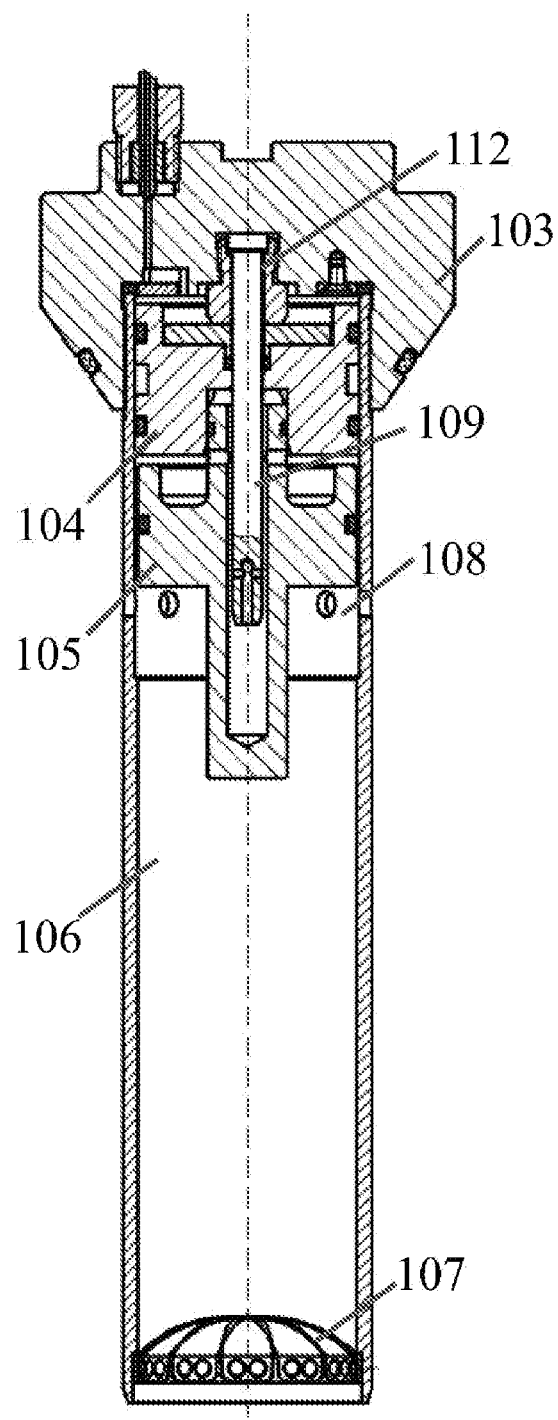
FIG. 4 is a sectional view of a sampling tube according to one embodiment of the present disclosure.

As shown in FIGS. 3 and 4, the sampling assembly 1 includes a handle 101, an extrusion valve 102, a needle valve core 103, a first piston, a sampling tube 106, and a capturing member 107. An upper part of the sampling tube 106 is threadedly connected to a lower part of the needle valve core 103. A lower end of the handle 101 is boltedly connected to a top of the needle valve core 103, and the first piston is provided on an inner wall of the sampling tube 106. The first piston is a two-stage piston. An upper side wall of the sampling tube 106 is provided with a plurality of drainage holes 108 evenly distributed, which helps to discharge the overlying water in the sampling tube 106 during sampling sediment. A bottom of the sampling tube 106 is provided with the capturing member 107 with a petal structure, which can cut off the connection between the sediment sample inside the sampling tube 106 and the seabed sediment, effectively reducing dropping the sediment sample in the sampling tube 106 during the sampling process. The extrusion valve 102 is welded to the handle 101 through a first fixing plate 110. The extrusion valve 102 includes a first pressure pipe 111 and is connected to the needle valve core 103 through the first pressure pipe 111. The first pressure pipe 111 passes through the needle valve core 103 to communicate with a cavity above the first piston. The sediment can be pushed and transferred by the first piston during the subsequent transfer process.

Figure 1:
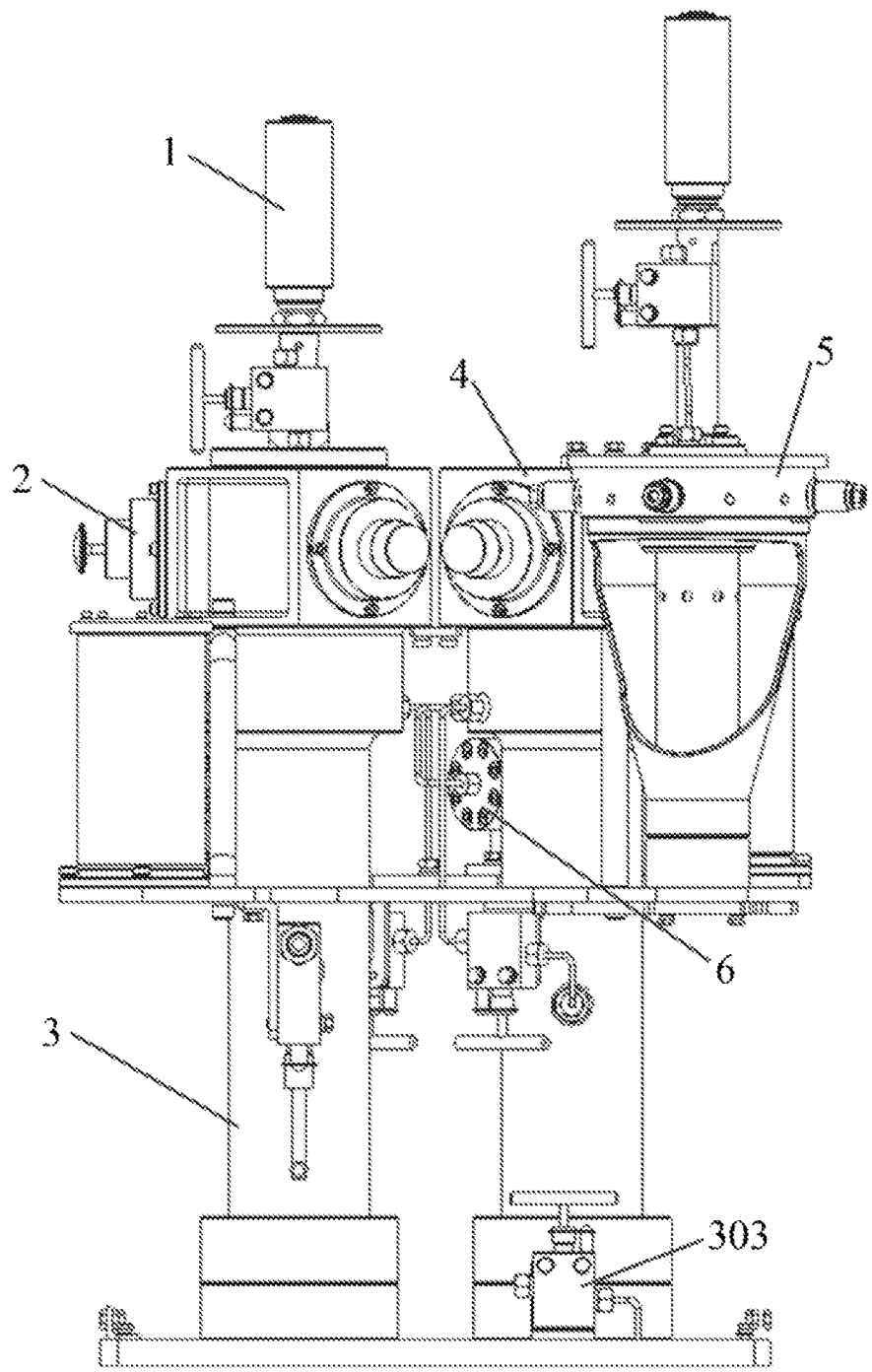
FIG. 1 schematically shows an external structure of a full-sea depth multi-point in-situ sampler according to one embodiment of the present disclosure.
Figure 2:
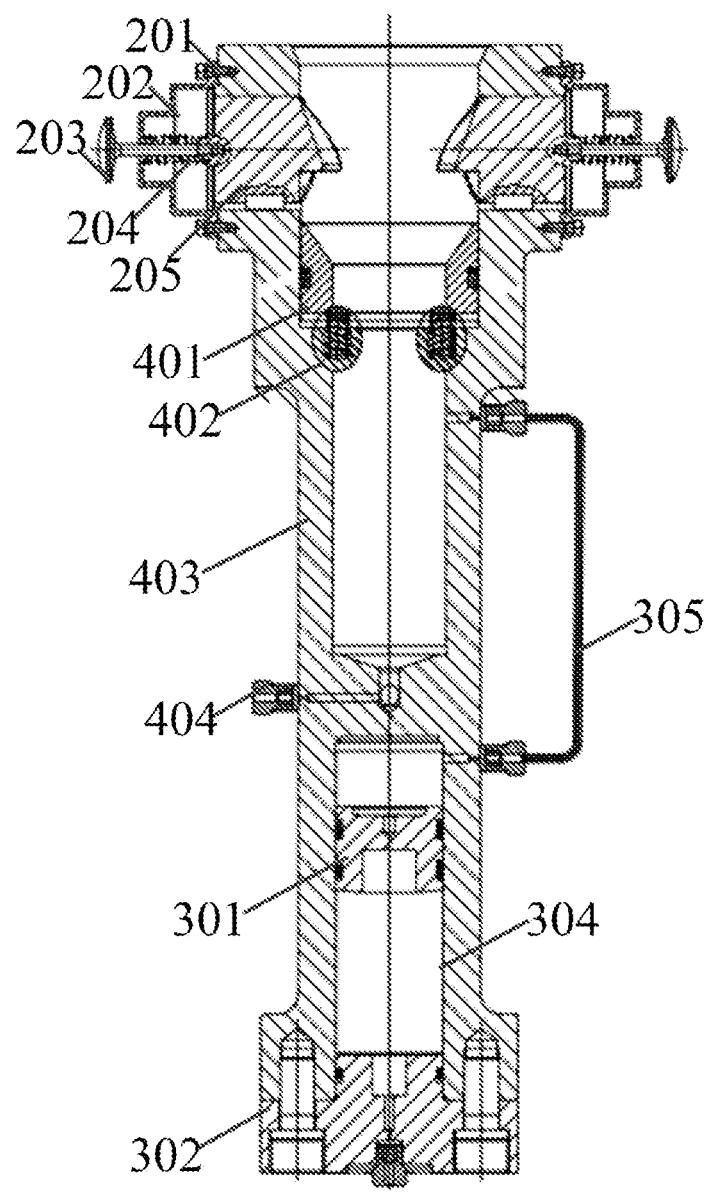
FIG. 2 is a sectional view of a pressure-retaining assembly and a pressure-compensating assembly according to one embodiment of the present disclosure.

As shown in FIGS. 1 and 2, the pressure-retaining assembly 4 includes a pressure-retaining cylinder 403, a locking mechanism 2, a floating valve core 401, a support spring 402, and a drainage device 6. The pressure-compensating assembly 3 includes a pressure-compensating cylinder 304, a second piston 301, and an end cap 302.

Figure 5:
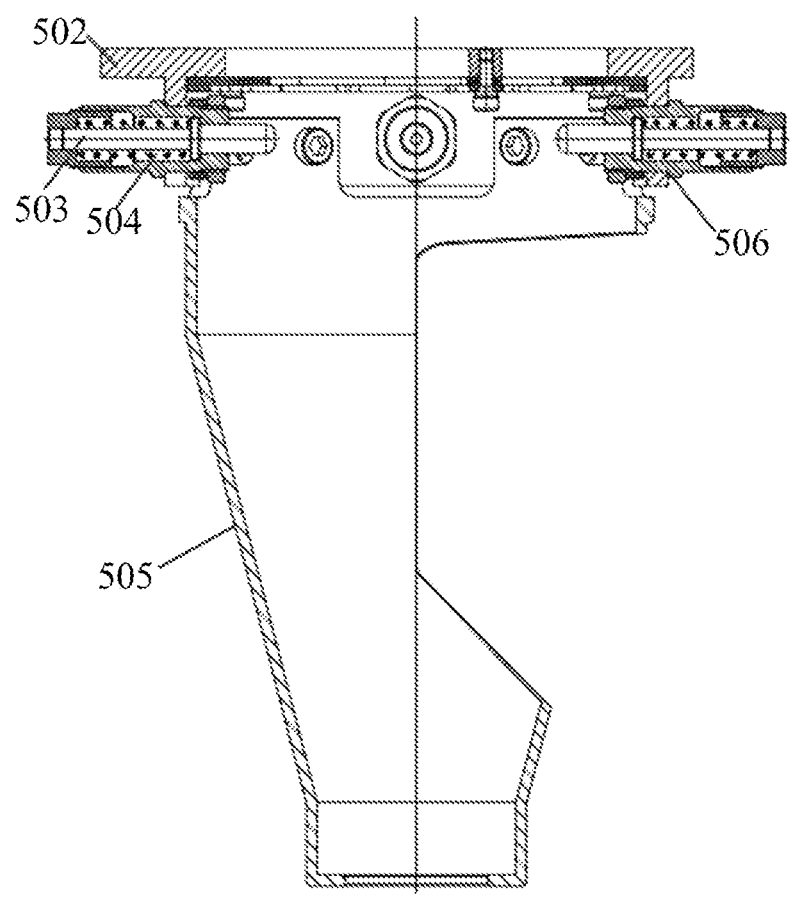
FIG. 5 is a sectional view of a cleaning assembly according to one embodiment of the present disclosure.

As shown in FIG. 5, the cleaning assembly 5 includes a cleaning sleeve 501, a cleaning cylinder 505, and a plurality of trigger mechanisms.

Referring to FIGS. 3 and 4 again, an upper part of the needle valve core 103 of the sampling assembly 1 is cylindrical, and the lower part of the needle valve core 103 is inverted frustum-shaped. The first piston includes a sealing piston unit 104 and an extrusion piston unit 105 installed sequentially from top to bottom. A first through hole is provided at a center of the sealing piston unit 104. An upper end of the extrusion piston unit 105 is connected with a lower end of the first through hole of the sealing piston unit 104, and a connection between the upper end of the extrusion piston unit 105 and the lower end of the first through hole of the sealing piston unit 104 is sealed by a first sealing ring. A first blind hole is provided at a center of the extrusion piston unit 105. An air-change rod 109 is fixed at a lower end of the needle valve core 103 through a port 112. The air-change rod 109 is coaxial with the first through hole of the sealing piston unit 104 and the first blind hole of the extrusion piston unit 105. The air-change rod 109 is inserted into the first through hole of the sealing piston unit 104 and the first blind hole of the extrusion piston unit 105. A lower end of the air-change rod 109 is provided with a second blind hole. An outer wall of the second blind hole on the lower end of the air-change rod 109 is symmetrically provided with two second through holes. During the working process, high-pressure water flows through two second through holes on the outer wall of the second blind hole of the air-change rod 109, and then flows out from the second blind hole at the lower end of the air-change rod 109. As shown in FIG. 4, a low end of the second blind hole is open, and an upper end of the second blind hole is closed. The high-pressure water flows into the second blind hole through two second through holes and flows out of the low end of the second blind hole. The sealing piston unit 104 and the extrusion piston unit 105 are sealed with the inner wall of the sampling tube 106 through a second sealing ring.

Referring to FIG. 2 again, the locking mechanism 2 of the pressure-retaining assembly 4 includes a pull rod 203, an outer cover 202, a locking spring 204, and a thrust part 205. An upper part of the pressure-retaining cylinder 403 is provided with a plurality of first holes in the same level. The plurality of first holes are provided along the radial direction of the pressure-retaining cylinder 403. The thrust part 205 is installed in the plurality of first holes. The outer cover 202 is fixed on the outer side wall of the upper part of the pressure-retaining cylinder 403 by bolts 201. The outer cover 202 is provided with a second hole. The pull rod 203 passes through the second hole to be connected with the thrust part 205. The locking spring 204 is sleevedly provided on the pull rod 203. One end of the locking spring 204 is fixedly connected with the outer cover 202, and the other end of the locking spring 204 is fixedly connected with the thrust part 205. The thrust part 205 is radially provided with a first key slot. A key is fixedly provided in the first key slot. The thrust part 205 is movable in the plurality of first holes. A side wall of each of the plurality of first holes is provided with a second key slot for guiding movement of the thrust part 205 in the plurality of first holes. The key is disposed in the second key slot. The upper part of the inner side of the thrust part 205 is an inverted cone surface, and the lower part of the inner side of each of the thrust parts 205 is a cylindrical surface matching the upper part of the needle valve core 103. The number of the locking mechanism 2 is three, and the three locking mechanisms are evenly distributed on the outer wall of the pressure-retaining cylinder 403 in a circumferential direction, for restraining the axial displacement of the sampling tube 106 in the pressure-retaining cylinder 403.

Referring to FIG. 2 again, an inner hole of the pressure-retaining cylinder 403 of the pressure-retaining assembly 4 below the thrust part 205 of the locking mechanism 2 is a stepped hole. A step surface of the inner hole is provided with a plurality of blind holes parallel to an axis of the pressure-retaining cylinder 403. Each of the plurality of blind holes is provided with the support spring 402. The upper end of the support spring 402 is provided with the floating valve core 401. An upper surface of the floating valve core 401 is an inverted conical surface matching with the lower part of the needle valve core 103. A ring washer and a sealing ring are provided to realize the radial sealing between the floating valve core 401 and the pressure-retaining cylinder 403. The pressure-retaining cylinder 403 of the pressure-retaining assembly 4 is made of TC4 titanium alloy material, which has the advantages of corrosion resistance, high strength, and light weight. The outer diameter of the sampling tube 106 of the sampling assembly 1 is less than the inner diameter of the pressure-retaining cylinder 403 of the pressure-retaining assembly 4, and the length of the sampling tube 106 is less than the height of the pressure-retaining cylinder 403, so that the sampling tube 106 can be inserted vertically into the pressure-retaining cylinder 403.

Figure 6:
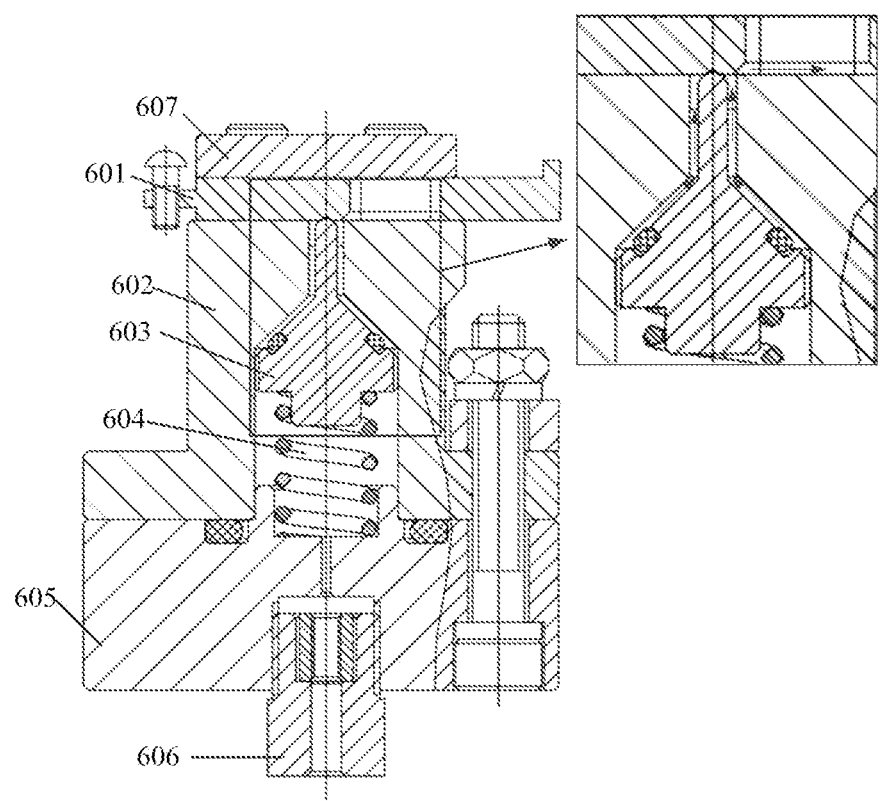
FIG. 6 is a sectional view of a drainage device according to one embodiment of the present disclosure.
Figure 7:
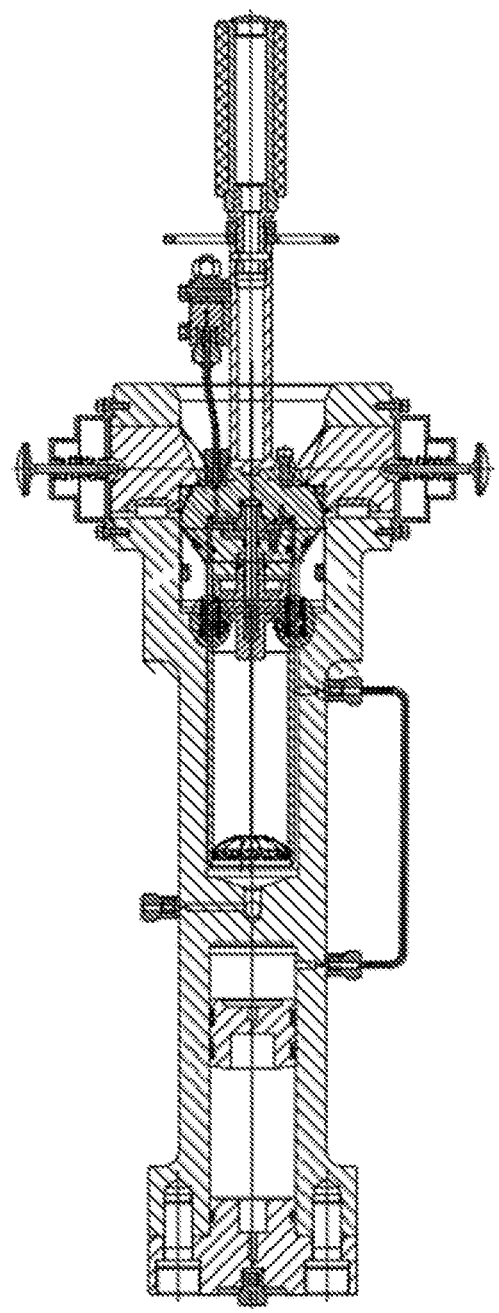
FIG. 7 is a sectional view of the full-sea depth multi-point in-situ sampler according to one embodiment of the present disclosure.

As shown in FIG. 6, the drainage device 6 of the pressure-retaining assembly 4 includes a top cover 607, a pull rod 601, an ejector pin 603, a spring 604, a valve body 602, and a valve seat 605. The top cover 607 is boltedly connected to the valve body 602. The side wall of the top cover 607 is provided with a through hole. The pull rod 601 is provided in the through hole. A gap is left between the pull rod 601 and the through hole. A right side of the pull rod 601 is provided with a U-shaped groove. The ejector pin 603 and the spring 604 are disposed inside the valve body 602. The valve body 602 is boltedly connected to the valve seat 605. The upper end of the valve seat 605 is provided with a blind hole at the center. The lower end of the spring 604 is installed in the blind hole, and the upper end of the spring 604 is connected with the lower end of the ejector pin 603. When the pull rod 601 is pulled to the left, the upper end of the ejector pin 603 is in contact with the U-shaped groove on the right side of the pull rod 601, and the spring 604 pushes the ejector pin 603 to move upward, thereby closing the drainage device 6. When the pull rod 601 is pushed to the right, the ejector pin 603 is in contact with the lower end surface of the pull rod 601, and the ejector pin 603 compresses the spring 604, thereby opening the drainage device 6. The drainage device 6 communicates with the pressure port 404 of the pressure-retaining assembly 4 via the pressure port 606 on the bottom of the drainage device 6. Before deploying the full-sea depth multi-point in-situ sampler, the drainage device 6 is open. After completing sampling, the manipulator inserts the sampling assembly into the pressure-retaining assembly, and the excess water in the pressure-retaining assembly flows out into the valve body 602 of the drainage device 6 through the pressure port 404, and the water flows out from the gap between the ejector pin 603 and the valve body 602.

Referring to FIG. 2, the pressure-compensating assembly 3 and the pressure-retaining assembly 4 are a one-piece structure. The pressure-compensating cylinder 304 is located below a partition between the pressure-compensating cylinder 304 and the pressure-retaining cylinder 403. The end cap 302 of the pressure-compensating assembly 3 is sealedly provided at the bottom opening of the pressure-compensating cylinder 304. The end cap 302 is provided with a through hole. A second pressure pipe is provided in the through hole of the end cap 302 for connection with a charging valve 303. The second piston 301 is placed in the pressure-compensating cylinder 304 to divide the pressure-compensating cylinder 304 into an upper cavity and a lower cavity. The upper cavity of the pressure-compensating cylinder 304 is communicated with the pressure-retaining cylinder 403 through the third pressure pipe 305, avoiding the blockage caused by the floating of sediment particles between the pressure-retaining assembly 4 and the pressure-compensating assembly 3, and avoiding affecting the pressure-retaining effect.

As shown in FIG. 5, a top of the cleaning assembly 5 is provided with a second fixing plate 502. The cleaning assembly 5 is connected to the upper end surface of the pressure-retaining assembly 4 through the second fixing plate 502. The cleaning cylinder 505 is boltedly connected to a lower part of the second fixing plate 502. The side wall of the top of the cleaning cylinder 505 is evenly distributed with multiple trigger mechanisms. The cleaning sleeve 501 is installed on the outer side of the needle valve core 103 of the sampling assembly 1.

Referring to FIG. 5 again, the number of the plurality of trigger mechanisms is four, and four trigger mechanisms are evenly distributed on an outer wall of the cleaning cylinder 505 in a circumferential direction for restraining the axial displacement of the cleaning sleeve 501 in the cleaning cylinder 505. Each of the four trigger mechanisms includes a trigger rod 503, a compression spring 504, and a trigger cylinder 506. The outer wall of the cleaning cylinder 505 is provided with a trigger cylinder hole, and the trigger cylinder 506 is installed in the trigger cylinder hole. The trigger cylinder 506 is provided with a guide hole, and the trigger rod 503 is inserted in the guide hole. Two ends of the compression spring 504 are respectively connected to the trigger cylinder hole and one end of the trigger rod 503. The other end of each trigger rod 503 faces toward the axis of the cleaning cylinder 505.

The number of the sampling assembly and the number of the pressure-retaining assembly are both two or more, for sampling sediments at different points of deep sea.

A sampling and transfer method based on the full-sea depth multi-point in-situ sampler includes the following steps.

(1) Before deploying the full-sea depth multi-point in-situ sampler, an inert gas is filled in the lower cavity of the pressure-compensating cylinder 304 by the charging valve 303. At this time, the second piston 301 is located at the top of the cavity of the pressure-compensating cylinder 304. The full-sea depth multi-point in-situ sampler is fixed on a submersible. The cleaning sleeve 501 of the cleaning assembly 5 is fixed at the needle valve core 103 of the sampling assembly 1. The pull rod 601 of the drainage device 6 is pushed to connect the drainage device 6 with the pressure-retaining assembly 4.

(2) During a launching process of the submersible, under the action of seawater pressure, the second piston 301 in the pressure-compensating assembly 3 will move down until a pressure balance is reached between the lower cavity and the upper cavity of the pressure-compensating cylinder 304.

(3) When the submersible reaches a preset seabed depth, the sampling assembly 1 is pressed into seabed sediment through a manipulator until the sampling tube 106 is completely inserted into the seafloor sediment. During the insertion of the sampling tube 106 into the seabed sediment, seawater in the sampling tube 106 will be discharged outward through the plurality of drainage holes 108 distributed radially at the top of the sampling tube 106.

(4) After the sampling is completed, the sampling assembly 1 is inserted into the cleaning cylinder 505 of the cleaning assembly 5 through the manipulator. The trigger mechanisms at the upper end of the cleaning cylinder 505 clamps the cleaning sleeve 501 at the needle valve core 103, and the center of the cleaning sleeve 501 is provided with a through hole having a cone surface matching with an outer wall of the needle valve core 103, and the cleaning sleeve 501 is installed on the outer wall of the needle valve core 103. The cleaning sleeve 501 is made of polyoxymethelene (POM) plastic. When the sampling assembly 1 is pulled out by the manipulator, since the axial movement of the cleaning sleeve 501 is limited by the plurality of the trigger mechanisms, so a relative displacement occurs between the cleaning sleeve 501 and the sampling assembly 1, so that the sediments adhering to the outer surface of the sampling assembly 1 are scrapped off, thereby completing cleaning of the outer surface of the sampling assembly 1.

(5) The sampling tube 106 of the sampling assembly 1 is pulled out from the cleaning assembly 5 and inserts the sampling tube 106 into the pressure-retaining assembly 4. Guided by an oblique cone surface of the floating valve core 401, an outer wall of the sampling tube 106 is in contact with the thrust part 205, the thrust part 205 compresses the locking spring 204 to drive the pull rod 203 to move outward, the sampling tube 106 moves downward, and three thrust parts 205 are reset under the action of the locking spring 204. The sampling tube 106 is locked in the pressure-retaining assembly 4 to constrain the upward axial displacement of the needle valve core 103. The pull rod 601 of the drainage device 6 is pulled to close the drainage device 6.

(6) While the full-sea depth multi-point in-situ sampler recovers, due to decrease of the seawater pressure, the inert gas in the pressure-compensating assembly 3 will drive the second piston 301 to move towards the upper cavity of the pressure-compensating cylinder 304, such that seawater in the upper cavity of the pressure-compensating cylinder 304 is forced to flow into the pressure-retaining cylinder 403 through the pressure pipe 305, thereby compensating for the pressure loss caused by the expansion and deformation of the pressure-retaining cylinder 403.

(7) The full-sea depth multi-point in-situ sampler is coupled with the transfer device. The pressurized pump is connected to the extrusion valve 102. The pressure in the upper part of the sampling tube 106 is pressurized, so that the pressure in the upper part of the sampling tube 106 is greater than the pressure in a lower part of the sampling tube 106. The sealing piston unit 104 and the extrusion piston unit 105 slide down under the action of pressure difference. When the plurality of drainage holes 108 on the sampling tube 106 are sealed by the sealing piston 104, the water in the sampling tube 106 reaches the middle cavity of the sampling tube 106 through the two holes at the lower end of the air-change rod 109, and the sealing piston 104 stops moving.

(8) A pressure difference between the middle cavity and a lower cavity of the sampling tube 106 as pressure of the middle cavity of the sampling tube 106 continues to increase. Under the action of the pressure difference, the extrusion piston unit 105 pushes the sediments in the lower cavity of the sampling tube 106 to transfer to the transfer device.

What is claimed is:

1. A full-sea depth multi-point in-situ sampler, comprising:
a sampling assembly;
a pressure-retaining assembly;
a pressure-compensating assembly; and
a cleaning assembly;
wherein the sampling assembly comprises a handle, an extrusion valve, a needle valve core, a first piston, a sampling tube, and a capturing member;
an upper part of the sampling tube is threadedly connected to a lower part of the needle valve core; a lower end of the handle is boltedly connected to a top of the needle valve core; the first piston is provided on an inner wall of the sampling tube, and the first piston is a two-stage piston; an upper side wall of the sampling tube is provided with a plurality of drainage holes; a bottom of the sampling pipe is provided with the capturing member; the extrusion valve is fixedly connected to the handle through a first fixing plate; the extrusion valve comprises a first pressure pipe, and is connected to the needle valve core through the first pressure pipe; and the first pressure pipe is configured to pass through the needle valve core to communicate with a cavity above the first piston;
the pressure-retaining assembly comprises a pressure-retaining cylinder, a locking mechanism, a floating valve core, a support spring, and a drainage device;
the pressure-compensating assembly comprises a pressure-compensating cylinder, a second piston, and an end cap; and
the cleaning assembly comprises a cleaning sleeve, a cleaning cylinder, and a plurality of trigger mechanisms.

2. The full-sea depth multi-point in-situ sampler of claim 1, wherein an upper part of the needle valve core is cylindrical, and the lower part of the needle valve core is inverted frustum-shaped; and
the first piston comprises a sealing piston unit and an extrusion piston unit from top to bottom; a first through hole is provided at a center of the sealing piston unit; an upper end of the extrusion piston unit is connected with a lower end of the first through hole of the sealing piston unit, and a connection between the upper end of the extrusion piston unit and the lower end of the first through hole is sealed by a first sealing ring; a first blind hole is provided at a center of the extrusion piston unit; an air-change rod is fixed at a lower end of the needle valve core through a port; the air-change rod is coaxial with the first through hole and the first blind hole, and is configured to be inserted into the first through hole and the first blind hole; a lower end of the air-change rod is provided with a second blind hole; an outer wall of the second blind hole is symmetrically provided with two second through holes; and the sealing piston unit and the extrusion piston unit are sealed with the inner wall of the sampling tube through a second sealing ring.

3. The full-sea depth multi-point in-situ sampler of claim 1, wherein the locking mechanism comprises a pull rod, an outer cover, a locking spring, and a thrust part; and
an upper part of the pressure-retaining cylinder is provided with a plurality of first holes in the same level; the plurality of first holes are arranged along a radial direction of the pressure-retaining cylinder; the thrust part is installed in the plurality of first holes; the outer cover is boltedly fixed on an outer side wall of the upper part of the pressure-retaining cylinder; the outer cover is provided with a second hole; the pull rod is configured to pass through the second hole to be connected with the thrust part; the locking spring is sleevedly provided on the pull rod; one end of the locking spring is fixedly connected with the outer cover, and the other end of the locking spring is fixedly connected with the thrust part; the thrust part is radially provided with a first key slot; a key is fixedly provided in the first key slot; the thrust part is movable in the plurality of first holes; a side wall of each of the plurality of first holes is provided with a second key slot for guiding movement of the thrust part in the plurality of first holes; the key is disposed in the second key slot; and an upper part of an inner side of the thrust part is an inverted cone surface, and the lower part of the inner side of the thrust part is a cylindrical surface matching with an upper part of the needle valve core.

4. The full-sea depth multi-point in-situ sampler of claim 1, wherein the number of the locking mechanism is three, and three locking mechanisms are evenly distributed on an outer wall of the pressure-retaining cylinder in a circumferential direction.

5. The full-sea depth multi-point in-situ sampler of claim 1, wherein an inner hole of the pressure-retaining cylinder below the locking mechanism is a stepped hole; a step surface of the inner hole is provided with a plurality of blind holes parallel to an axis of the pressure-retaining cylinder; each of the plurality of blind holes is provided with the support spring; an upper end of the support spring is provided with the floating valve core; an upper surface of the floating valve core is an inverted conical surface matching with the lower part of the needle valve core; and a ring washer and a sealing ring are provided to realize a radial sealing between the floating valve core and the pressure-retaining cylinder.

6. The full-sea depth multi-point in-situ sampler of claim 1, wherein the drainage device comprises a top cover, a pull rod, an ejector pin, a spring, a valve body, and a valve seat; the top cover is boltedly connected to the valve seat; a side wall of the top cover is provided with a first through hole; the pull rod is provided in the first through hole, and a gap is provided between the pull rod and the first through hole; a side of the pull rod is provided with a U-shaped groove; a lower part of the ejector pin is cylindrical, a middle part of the ejector pin is frustum-shaped, and an upper part of the ejector pin is a cylinder with a spherical top surface; an internal center of the valve body is provided with a second through hole matching with the ejector pin; the ejector pin is provided in the second through hole; a gap is provided between the second through hole and the ejector pin; a first sealing ring is provided on the middle part of the ejector pin to realize an axial sealing between the second through hole and the ejector pin while the ejector pin is moved up; the valve body is boltedly connected to the valve seat; the valve seat is provided with a second sealing ring to realize a radial sealing between the valve body and the valve seat; a center on an upper end surface of the valve seat is provided with a blind hole; a lower end of the spring is installed in the blind hole; an upper end of the spring is connected with a lower end of the ejector pin; a bottom of the valve body is provided with a pressure port; a top of the pressure port is communicated with a bottom of the blind hole, and a bottom of the pressure port is connected to a pressure port of the pressure-retaining assembly; when the pull rod is pulled along a first direction, an upper end of the ejector pin is in contact with the U-shaped groove, and the spring pushes the ejector pin to move upward, thereby closing the drainage device; and when the pull rod is pushed along a second direction opposite to the first direction, the second ejector pin is in contact with a lower end surface of the pull rod, and the spring is compressed by the ejector pin, thereby opening the drainage device.

7. The full-sea depth multi-point in-situ sampler of claim 1, wherein the pressure-compensating assembly is integrated with the pressure-retaining assembly; the pressure-compensating cylinder is located below a partition between the pressure-compensating cylinder and the pressure-retaining cylinder; the end cap is sealedly provided at a bottom opening of the pressure-compensating cylinder; the end cap is provided with a through hole; a second pressure pipe is provided in the through hole for connection with a charging valve; the second piston is arranged in the pressure-compensating cylinder to divide the pressure-compensating cylinder into an upper cavity and a lower cavity; and the upper cavity of the pressure-compensating cylinder is communicated with the pressure-retaining cylinder through a third pressure pipe.

8. The full-sea depth multi-point in-situ sampler of claim 1, wherein a top of the cleaning assembly is provided with a second fixing plate; the cleaning assembly is connected to an upper end surface of the pressure-retaining assembly through the second fixing plate; the cleaning cylinder is boltedly connected to a lower part of the second fixing plate; the plurality of trigger mechanisms are evenly distributed on a side wall of a top of the cleaning cylinder; and the cleaning sleeve is installed on an outer side of the needle valve core.

9. The full-sea depth multi-point in-situ sampler of claim 1, wherein the number of the plurality of trigger mechanisms is four, and four trigger mechanisms are evenly distributed on an outer wall of the cleaning cylinder in a circumferential direction; each of the four trigger mechanisms comprises a trigger rod, a compression spring, and a trigger cylinder; the outer wall of the cleaning cylinder is provided with a trigger cylinder hole, and the trigger cylinder is installed in the trigger cylinder hole; the trigger cylinder is provided with a guide hole; the trigger rod is insertedly provided in the guide hole; one end of the compression spring is connected to the trigger cylinder hole, and the other end of the compression spring is connected to one end of the trigger rod; and the other end of the trigger rod faces toward an axis of the cleaning cylinder.

10. The full-sea depth multi-point in-situ sampler of claim 1, wherein the pressure-retaining cylinder is made of a titanium alloy material.

11. The full-sea depth multi-point in-situ sampler of claim 1, wherein an outer diameter of the sampling tube is less than an inner diameter of the pressure-retaining cylinder; and a length of the sampling tube is less than a height of the pressure-retaining cylinder.

12. The full-sea depth multi-point in-situ sampler of claim 1, wherein the number of the sampling assembly and the number of the pressure-retaining assembly are both two or more.

13. A sampling and transfer method based on the full-sea depth multi-point in-situ sampler of claim 2, comprising:
(a) before deploying the full-sea depth multi-point in-situ sampler, filling a lower cavity of the pressure-compensating cylinder with inert gas through a charging valve, wherein the second piston is located at a top of a cavity of the pressure-compensating cylinder; fixing the full-sea depth multi-point in-situ sampler to a submersible; fixing the cleaning sleeve to the needle valve core; and pushing a pull rod of the drainage device to connect the drainage device with the pressure-retaining assembly;
(b) during a launching process of the submersible, under the action of seawater pressure, moving the second piston downward until a pressure balance is reached between the lower cavity and an upper cavity of the pressure-compensating cylinder;
(c) when the submersible reaches a preset seabed depth, pressing the sampling assembly into seabed sediment through a manipulator until the sampling tube is completely inserted into the seabed sediment, wherein while the sampling tube is inserted into the seabed sediment, seawater in the sampling tube is discharged through the plurality of drainage holes distributed radially at a top of the sampling tube;
(d) After completing sampling, inserting the sampling assembly into the cleaning cylinder through the manipulator; clamping the cleaning sleeve at the needle valve core by the plurality of trigger mechanisms at an upper end of the cleaning cylinder, wherein a center of the cleaning sleeve is provided with a third through hole having a cone surface matching with an outer wall of the needle valve core, and the cleaning sleeve is installed on the outer wall of the needle valve core; pulling the sampling assembly out by the manipulator, wherein since an axial movement of the cleaning sleeve is restricted by the plurality of trigger mechanisms, a relative displacement occurs between the cleaning sleeve and the sampling assembly, such that sediments adhering to an outer surface of the sampling assembly are scraped off, thereby completing cleaning of the outer surface of the sampling assembly;
(e) pulling the sampling tube from the cleaning assembly, and inserting the sampling tube into the pressure-retaining assembly, wherein guided by an oblique cone surface of the floating valve core, an outer wall of the sampling tube is in contact with a thrust part; allowing the thrust part to compress a locking spring to drive a pull rod of the locking mechanism to move outward; moving the sampling tube downward; resetting the thrust part under the action of the locking spring, and locking the sampling tube in the pressure-retaining assembly to constrain an upward axial displacement of the needle valve core; and pulling the pull rod of the drainage device to close the drainage device;
(f) while recovering the full-sea depth multi-point in-situ sampler, due to decrease of the seawater pressure, driving, by the inert gas in the pressure-compensating assembly, the second piston to move towards the upper cavity of the pressure-compensating cylinder such that seawater in the upper cavity of the pressure-compensating cylinder is forced to flow into the pressure-retaining cylinder through a pressure pipe, thereby compensating for a pressure loss caused by expansion and deformation of the pressure-retaining cylinder;
(g) coupling the full-sea depth multi-point in-situ sampler with a transfer device through steps of:
(g1) connecting a pressurized pump with the extrusion valve;
(g2) pressurizing the upper part of the sampling tube to make a pressure in the upper part of the sampling tube greater than that in a lower part of the sampling tube; and
(g3) allowing the sealing piston unit and the extrusion piston unit to slide down under the action of pressure, wherein when the plurality of drainage holes on the sampling tube are sealed by the sealing piston unit, water in the sampling tube is allowed to reach a middle cavity of the sampling tube through the two holes at the lower end of the air-change rod, and the sealing piston unit stops moving; and
(h) forming a pressure difference between the middle cavity and a lower cavity of the sampling tube as pressure of the middle cavity of the sampling tube continues to increase; and under the action of the pressure difference between the middle cavity and the lower cavity of the sampling tube, pushing, by the extrusion piston unit, sediments in the lower cavity of the sampling tube to the transfer device.

* * * * *